United States Patent [19]

Alcumbrack

[11] Patent Number: 5,638,857
[45] Date of Patent: Jun. 17, 1997

[54] AIR LOCKOUT DEVICE

[76] Inventor: Douglas C. Alcumbrack, 7504 10 Mile Rd., Rockford, Mich. 49341

[21] Appl. No.: 523,466

[22] Filed: Sep. 5, 1995

[51] Int. Cl.⁶ .............................. B23Q 11/00; F16K 35/00
[52] U.S. Cl. .................................................. 137/377; 137/382
[58] Field of Search .................................. 137/377, 378, 137/379, 380, 381, 382

[56] References Cited

U.S. PATENT DOCUMENTS

| 1,084,996 | 1/1914 | Wright | 137/382 |
| 4,662,396 | 5/1987 | Avnon | 137/382 |
| 5,066,049 | 11/1991 | Staples | 285/80 |
| 5,161,568 | 11/1992 | Turvey | 137/383 |
| 5,182,928 | 2/1993 | O'Fearna | 70/232 |
| 5,464,114 | 11/1995 | Green | 137/377 |

FOREIGN PATENT DOCUMENTS 916207  1/1963  United Kingdom .................. 137/377

OTHER PUBLICATIONS

Napa Tool and Equipment Ad Brochure, p. 5 Jun./Jul. 1995

*Primary Examiner*—A. Michael Chambers
*Attorney, Agent, or Firm*—Warner Norcross & Judd

[57] ABSTRACT

An air lockout device for an air driven fixture. The lockout device includes a body defining a pair of axially offset intersecting bores. The first bore is fitted over a conventional male air fitting and the second bore extends through the body in alignment with the bearing seat of the male air fitting. A conventional padlock is fitted through the second bore and the bearing seat to secure the lockout device in place.

13 Claims, 3 Drawing Sheets

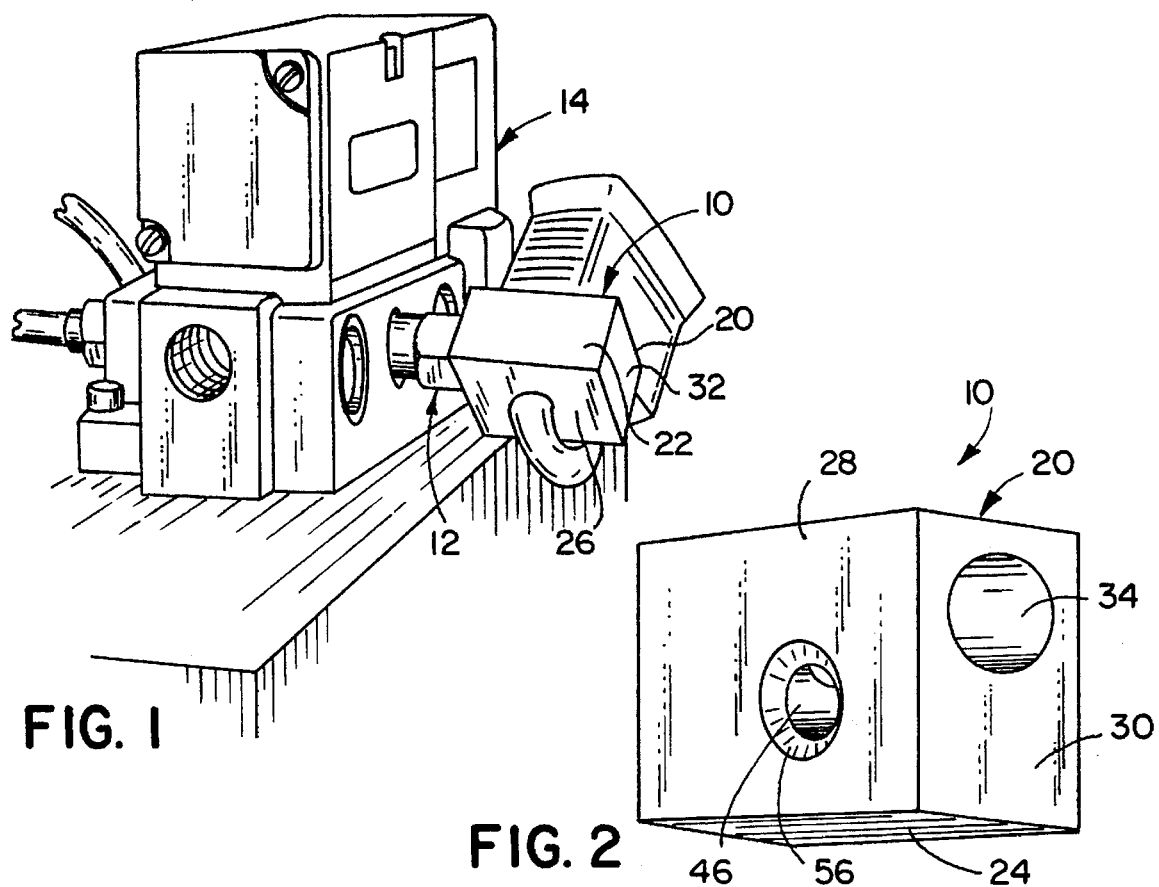
FIG. 1
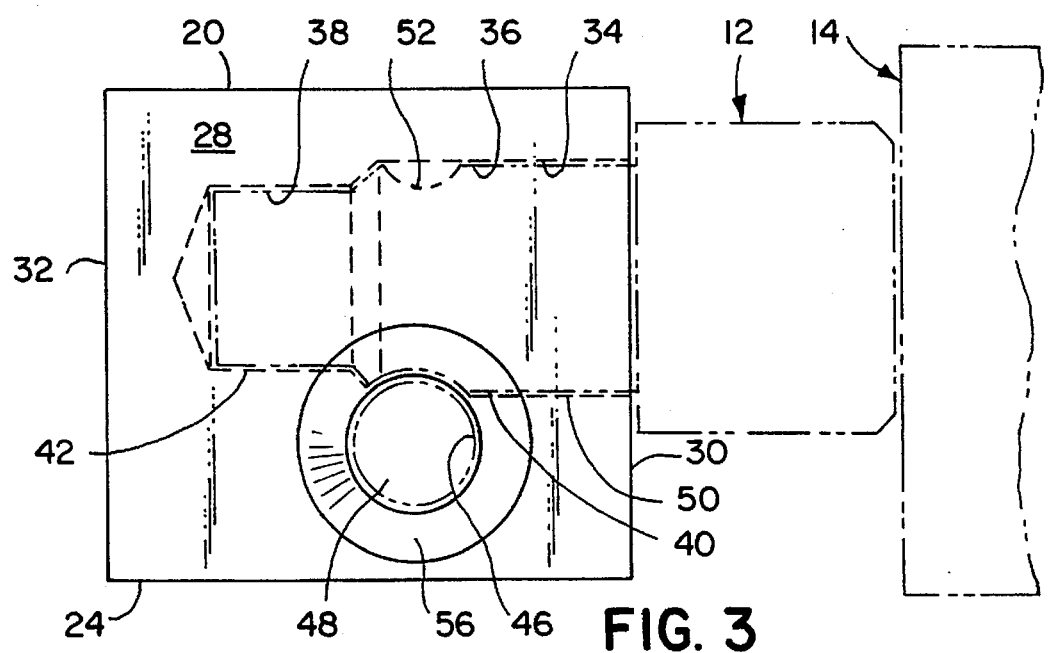
FIG. 2
FIG. 3

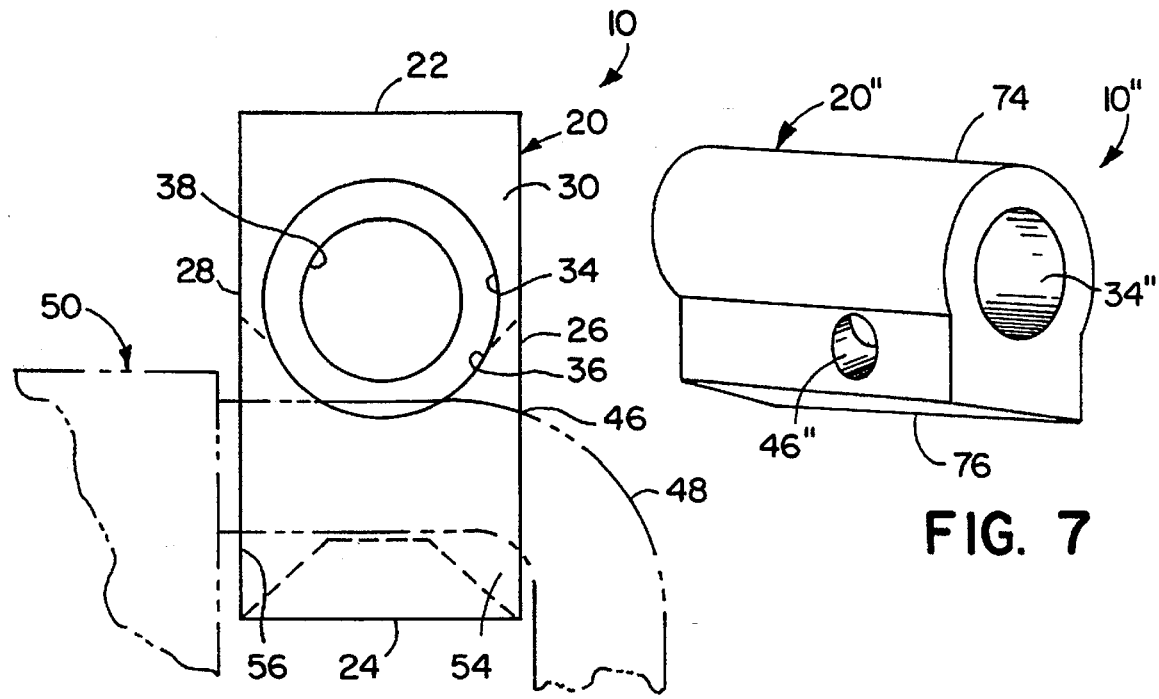
FIG. 4
FIG. 7
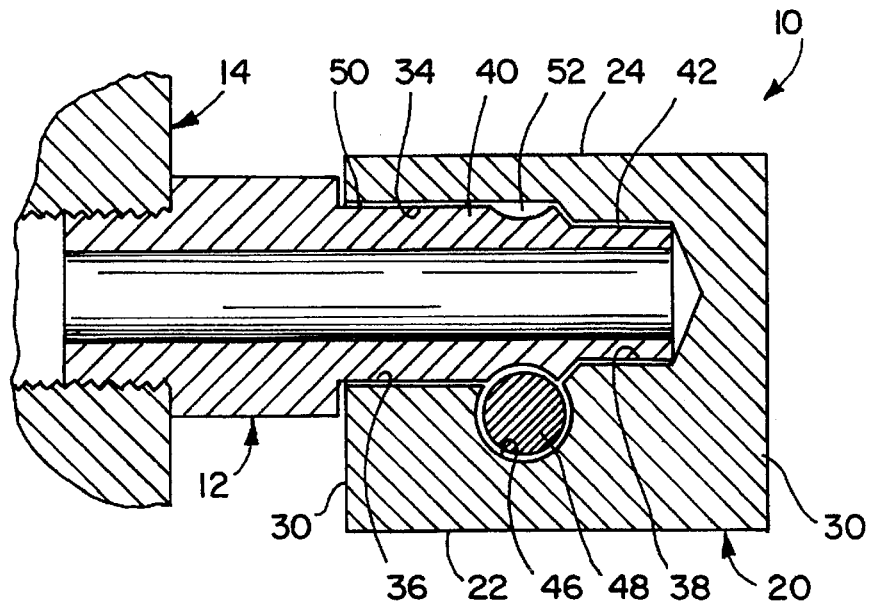
FIG. 5

AIR LOCKOUT DEVICE

BACKGROUND OF THE INVENTION

The present invention relates to industrial safety devices, and more particularly to an air lockout device for an air driven fixture.

Today's industrial manufacturing facilities rely heavily on air driven fixtures for machining and other processes. Air driven fixtures are powered by pressurized air to perform a variety of tasks such as grinding, cutting, and drilling. Over the years, safety regulations have been developed to govern the use of air driven fixtures. These regulations are designed to protect the safety and well-being of operators, servicemen, and others who may work with or in the vicinity of air driven fixtures. Typical safety regulations require that an air driven fixtures be locked out from the air supply during set-up, adjustment, repair, service, installation, and maintenance. Essentially, this regulation requires some type of mechanism for preventing unauthorized, accidental, or inadvertent connection of an air supply line to the fixture. Additionally, these regulations generally require a mechanism for releasing the pressurized air built-up within the fixture. If not released, this air could cause unintended operation of the fixture or unpredictable results during disassembly of the fixture.

A variety of air supply lockout devices have been developed to comply with these regulations. One type of commercially available air lockout device is a supply line lock box. The supply line lock box attaches to the supply line to prevent it from being connected to the fixture. The lock box includes a hinged shell that is closed over the end of the supply line to prevent access to the female fitting. Typically, the lock box includes a pair of ears or similar components that allow the lock box to be padlocked in place. A separate lock box must be installed on each supply line capable of supplying air to the fixture. Additionally, the lock box does nothing to release air pressure built-up in the fixture.

A second commercially available air lockout device is a locking valve. The locking valve is installed on the fixture between the male inlet and the operating components of the fixture. The locking valve includes a relatively complex bleeder arrangement that allows the pressurized air built-up in the fixture to be released as the valve is closed. Once closed, the valve can be padlocked in position to prevent inadvertent or unauthorized supply of air to the fixture. The locking valve is relatively expensive to purchase and install because a separate valve must be added to each fixture.

SUMMARY OF THE INVENTION

The aforementioned problems are overcome by the present invention which provides an air lockout device that is fitted over a conventional male air fitting and is padlocked in place to prevent attachment of a supply line. The lockout device generally includes a body portion defining a fitting bore axially offset from, and intersecting with a shank bore. The fitting bore extends at least partially through the length of the body and is fitted over the end of the male air fitting. The shank bore extends through the width of the body and is positioned to align with the bearing seat of the air fitting when installed.

The lockout device is secured in place by a conventional padlock. The padlock shank is fed through the shank bore such that it passes through the bearing seat of the air fitting. The interaction between the padlock shank and bearing seat prevent the lockout device from being removed from the air fitting.

The present invention provides a simple and effective air lockout device that is easily installed and removed. The lockout device also allows air built-up in the fixture to bleed through the male air fitting.

These and other objects, advantages, and features of the invention will be more readily understood and appreciated by reference to the detailed description of the preferred embodiment and the drawings.

BRIEF DESCRIPTION OF THE DRAWINGS

FIG. 1 is a perspective view of the present air lockout device installed on a conventional male air fitting;

FIG. 2 is a perspective view of the air lockout device;

FIG. 3 is a front elevational view of the air lockout device;

FIG. 4 is a side elevational view of the air lockout device;

FIG. 5 is a sectional view of the lockout device taken along line V—V in FIG. 1;

FIG. 7 is a perspective view of the second alternative lockout device; and

DETAILED DESCRIPTION OF THE PREFERRED EMBODIMENT

Figure 6:
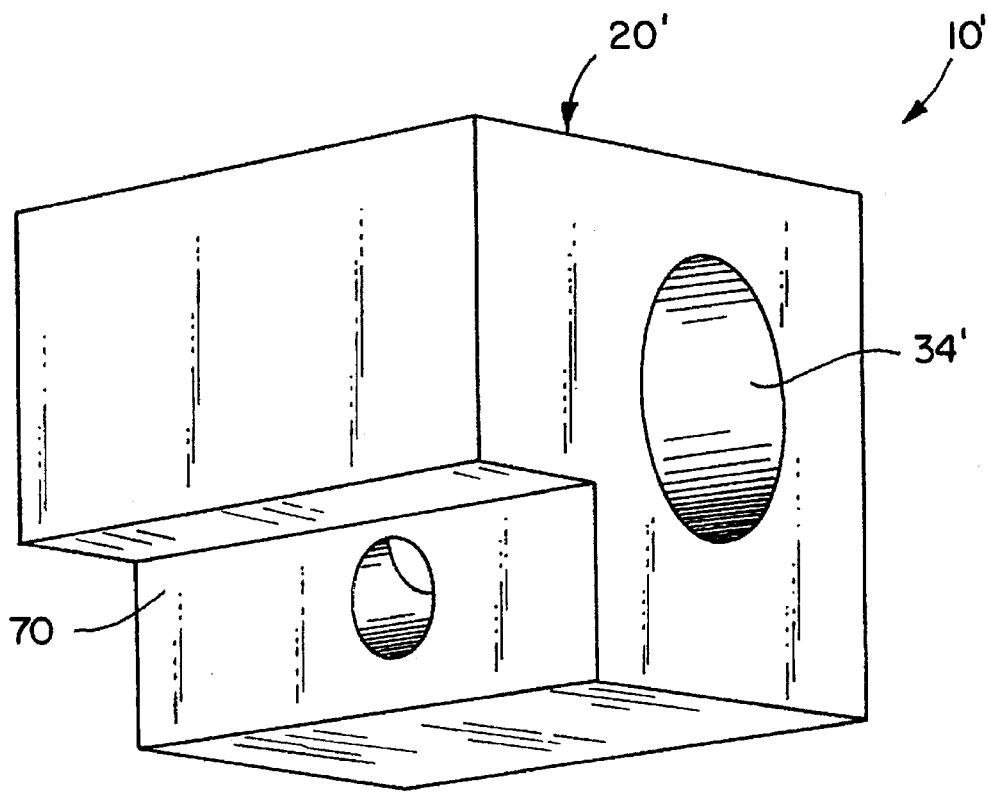
FIG. 6 is a perspective view of the first alternative lockout device.

A preferred embodiment of the present invention is illustrated in FIG. 1 and generally designated 10. The air lockout device of the present invention is describe in connection with a conventional male air fitting. However, the present invention is readily adaptable for use with other types of air or fluid fittings having recesses, protrusions, or other variations along their shaft.

The air lockout device 10 is installed on an air driven fixture to prevent an air supply line (not shown) from being connected thereto. As illustrated in FIG. 1, the air lockout device 10 is installed over the male air inlet fitting 12 of the fixture 14. By physically covering the air fitting 12, the lockout device 10 prevents inadvertent, accidental, or unauthorized coupling of a supply line to the fixture 14.

The air lockout device preferably includes a rectangular polyhedron body 20 having a top 22, bottom 24, front 26, back 28, and opposed sides 30 and 32. Referring now to FIGS. 2–5, the body 20 defines a fitting bore 34 extending through side 30. The fitting bore 34 preferably extends only partially through the body. However, in an alternative embodiment, the fitting bore 34 extends entirely through the body 10. The fitting bore 34 preferably include a full diameter portion 36 and a reduced diameter portion 38. As perhaps best illustrated in FIG. 5, the full and reduced diameter portions of the fitting bore 34 correspond with the full diameter 40 and reduced diameter 42 portions of the fitting 12. The fitting bore 34 preferably fits loosely over the fitting 12 to allow air to bleed from the fixture 14.

The body 20 also defines a shank bore 46 axially offset from and intersecting with fitting bore 34. The shank bore 46 extends entirely through the body 20 from front 26 to back 28 to receive the shank 48 of a conventional lock 50. The shank bore 46 is preferably perpendicular to the fitting bore 34 and is positioned in the body 20 to align with the bearing seat 52 of fitting 12. In addition, the radius of the shank bore 46 preferably matches that of bearing seat 52 and shank 48. The shank bore 46 is preferably countersunk at opposite ends. The countersinks 54 and 56 are dimensioned to allow a standard length padlock shank 48 to close upon the body 20. Optionally, a single countersink can be provided or, with longer length shanks, both countersinks can be eliminated.

The air lockout device 10 is preferably machined or cast from aluminum. However, in the alternative, the air lockout device 10 may be machined, molded, cast, or otherwise manufactured from plastic, such as polypropylene, or from other metals.

Operation

To install the air lockout device 10, the air supply line (not shown) is removed from the male air inlet fitting 12. The lockout device 10 is then fitted to the fixture 14 by sliding fitting bore 34 over the shaft 58 of the fitting 12. As noted above, the fitting bore 34 should fit loosely over the fitting 12 to allow air to bleed from the fixture 14. When properly seated, the shank bore 46 will be aligned with the beating seat 52 of the fitting 12.

Next, a conventional padlock 50 is opened to free the shank 48. The shank 48 is inserted into the shank bore 46 and fed entirely through the body 20. The shank 48 passes through the bearing seat 52 to physically prevent the lockout device 10 from being removed from the fitting 12. The padlock 50 is then closed to secure the device 10 in place.

To remove the lockout device 10, the padlock 50 is opened and removed from the shank bore 46, and the lockout device 10 is removed from the fitting 12.

Alternative Embodiments

Obviously, the shape of the body 20 can vary dramatically from application to application and still provide the desired function. For example, the body can be cylindrical or cubic and the fitting bore can extend partially or entirely through the body. A first alternative lockout device 10' is illustrated in FIG. 6. Lockout device 10' includes a body 20' that is substantially larger than body 20 described in connection with the preferred embodiment. The larger body increases the strength and integrity of the lockout device by increasing the wall thickness around the fitting bore 34'. A notch 70 extends along the length of body 20'. The notch 70 is of sufficient depth to allow a padlock having a standard shank to close on the lockout device 10'. The notch 70 can be eliminated to provide a lockout device designed for use with a padlock having a long shank (not shown). While not visible in FIG. 6, fitting bore 34' extends entirely through the body 20'.

A second alternative embodiment of the lockout device 10" is illustrated in FIG. 7. Lockout device 10" includes a body 20" having a generally cylindrical portion 74 and a generally rectangular shank mounting portion 76. The fitting bore 34" extends concentrically through the cylindrical portion 74. The shank mounting portion 76 extends downwardly from the cylindrical portion 74. Shank bore 46" extends through the shank mounting portion 76 to intersect with fitting bore 34".

Figure 8:
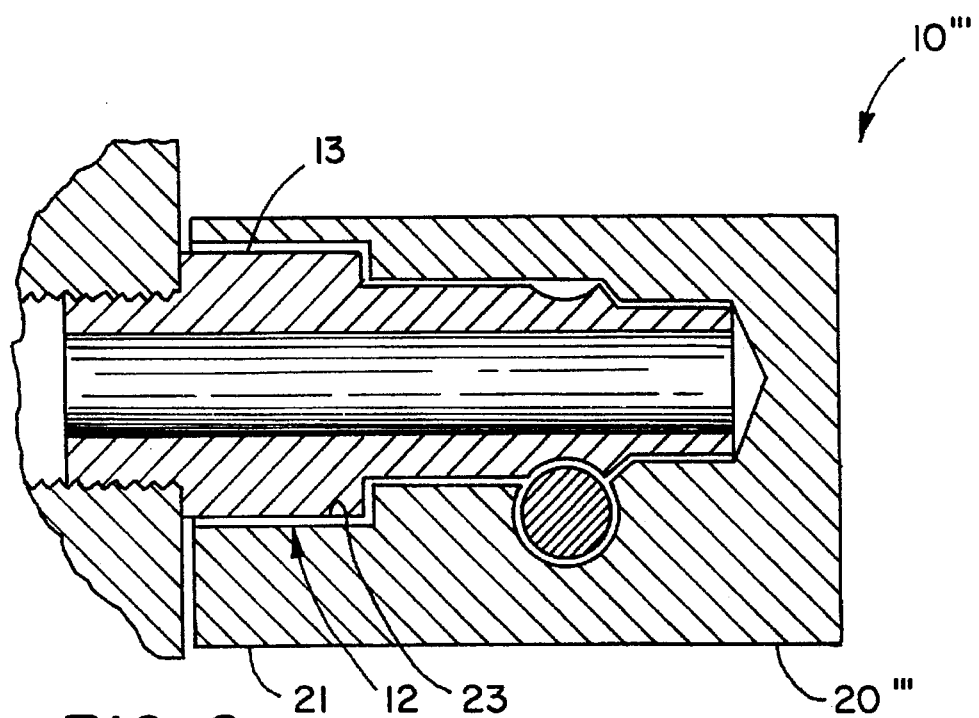
FIG. 8 is a sectional view of the third alternative lockout device.

FIG. 8 illustrates a third alternative embodiment of the air lockout device 10'". In this embodiment, the air lockout device 10'" is generally identical to the air lockout device 10 of the preferred embodiment except that the body 20'" includes an extended portion 21 to shroud the hexagonal portion 13 of the fitting 12. The hexagonal portion 13 allows the fitting 12 to be installed and removed easily with a standard wrench. The extended portion 21 of the air lockout device 10'" prevents a wrench from being placed over hexagonal portion 13 to remove the air fitting 12. Consequently, the extended portion 21 provides the air lockout device 10'" with an added level of security. A bore 23 extends through extended portion 21 in concentric alignment with fitting bore 34 to receive the hexagonal portion 21. Preferably, the diameter of bore 23 is substantially larger than the outside diameter of the hexagonal portion 21 of a standard air fining.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An air lockout device for an air driven fixture having a male air fitting, comprising:

a body having a width and defining first and second bores, said first and second bores intersecting and being axially offset from one another, said first bore being adapted to fit over the male air firing and said second bore located with said body to align with a beating seat of the male air fitting when said first bore is fitted over the male air fitting; and a locking means for securing said body to the male air firing, said locking means including a shank having a closed length greater than said width, said shank extending through said second bore and the beating seat of the male air firing when said first bore is fired over the male air fitting, whereby said shank interlocks said body with the male air fitting.

2. The lockout device of claim 1 wherein said first and second bores extend perpendicularly to one another.

3. The lockout device of claim 2 wherein said first bore defines a full diameter portion and a reduced diameter portion.

4. The lockout device of claim 3 wherein said first bore extends only partially through said body.

5. The lockout device of claim 3 wherein said first bore extends entirely through said body.

6. A lockout device for a male air fitting, comprising:

a body having a length and a width, said body defining a first bore extending at least partially through said length of said body and a second bore extending entirely through said width of said body; said first bore intersecting with and being axially offset from said second bore, said first bore adapted to fit over the male air fitting, said second bore adapted to align with a bearing seat of the male air fitting when said first bore is fitted over the male air fitting; and a locking means for securing said body to the male air fitting, said locking means including a shank having a closed length greater than said width, said shank extending through said second bore and the bearing seat of the male air fitting when said first bore is fitted over the male air firing, whereby said shank interlocks said body with the male air fitting.

7. The lockout device of claim 6, wherein the male air fitting includes a central portion adapted to receive a tool for installing and removing the fitting; and wherein said body includes an extended portion enshrouding the central portion of the fitting.

8. An air driven fixture, comprising:

a support structure;

an air driven tool supported by said support structure;

a male air fitting supported by said support structure, said fitting including a bearing seat;

an air line extending between said tool and said fitting;

an air lockout device fitted over said fitting, said lockout device including a body defining first and second bores, said first and second bores intersecting and being axially offset from one another, said first bore fitted over said fitting and said second bore aligned said bearing seat of said fitting; and a locking means for securing said body to the male air fitting, said locking means extending through said second bore.

9. The fixture of claim 8 wherein said first and second bores extend perpendicularly to one another.

10. The fixture of claim 9 wherein said first bore includes a full diameter portion and a reduced diameter portion.

11. The fixture of claim 10 wherein said locking means includes a padlock having a shank extending through said second bore, said shank having a closed length, said body including a width smaller than said closed length of said shank.

12. The fixture of claim 11 wherein said first bore extends only partially through said body.

13. The fixture of claim 11 wherein said first bore extends entirely through said body.

* * * * *

UNITED STATES PATENT AND TRADEMARK OFFICE
CERTIFICATE OF CORRECTION

PATENT NO. : 5,638,857
DATED : June 17, 1997
INVENTOR(S) : Douglas C. Alcumbrack It is certified that error appears in the above-indentified patent and that said Letters Patent is hereby corrected as shown below:

Column 4, Claim 1, Line 21:
   Delete "firing" and insert --fitting--

Column 4, Claim 1, Line 22:
   Delete "beating" and insert --bearing--

Column 4, Claim 1, Line 26:
   Delete "firing" and insert --fitting--

Column 4, Claim 1, Line 28:
   Delete "beating" and insert --bearing--

Column 4, Claim 1, Line 29:
   Delete "firing" and insert --fitting--

Column 4, Claim 1, Line 29:
   Delete "fired" and insert --fitted--

Column 4, Claim 6, Line 56:
   Delete "firing" and insert --fitting--

Signed and Sealed this

Twenty-third Day of December, 1997

Attest:

BRUCE LEHMAN

*Attesting Officer*         Commissioner of Patents and Trademarks